May 16, 1939.      C. W. FREDERICK ET AL      2,158,179

PHOTOGRAPHIC OBJECTIVE

Filed May 22, 1937

FIG. 1.

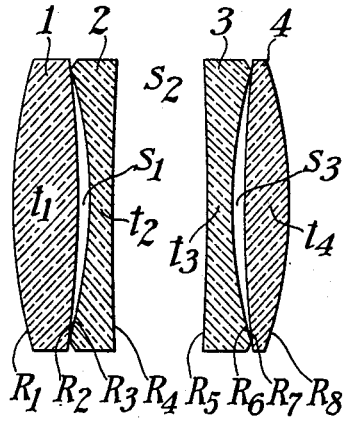

f = 100 mm  Speed - f/2.0

| LENS | GLASS | RADII | SPACINGS |
|---|---|---|---|
| 1 | $N_D = 1.9007$ <br> $\nu = 42.5$ | $R_1 = +95.7$ mm <br> $R_2 = -177.8$ " | $t_1 = 11.9$ mm <br> $S_1 = 1.84$ " |
| 2 | $N_D = 1.7616$ <br> $\nu = 26.5$ | $R_3 = -87.2$ " <br> $R_4 = +3460.0$ " | $t_2 = 4.15$ " <br> $S_2 = 1.78$ " |
| 3 | $N_D = 1.7616$ <br> $\nu = 26.5$ | $R_5 = -1913.0$ " <br> $R_6 = +89.0$ " | $t_3 = 4.15$ " <br> $S_3 = 2.66$ " |
| 4 | $N_D = 1.9007$ <br> $\nu = 42.5$ | $R_7 = +340.5$ " <br> $R_8 = -78.5$ " | $t_4 = 7.90$ " |

FIG. 2.

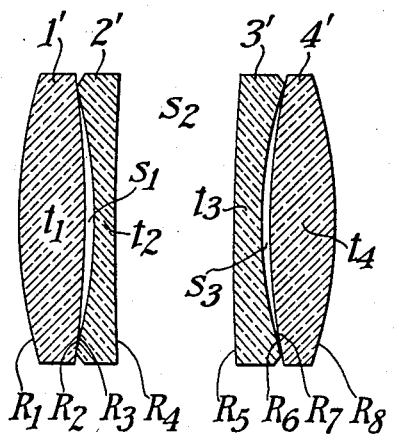

f = 100 mm  Speed - f/2.0

| LENS | GLASS | RADII | SPACINGS |
|---|---|---|---|
| 1' | $N_D = 1.9007$ <br> $\nu = 42.5$ | $R_1 = +96.8$ mm <br> $R_2 = -174.5$ " | $t_1 = 11.9$ mm <br> $S_1 = 1.55$ " |
| 2' | $N_D = 1.8049$ <br> $\nu = 25.5$ | $R_3 = -94.1$ " <br> $R_4 = +2170.0$ " | $t_2 = 4.15$ " <br> $S_2 = 21.8$ " |
| 3' | $N_D = 1.8049$ <br> $\nu = 25.5$ | $R_5 = +882.0$ " <br> $R_6 = +81.5$ " | $t_3 = 4.15$ " <br> $S_3 = 2.45$ " |
| 4' | $N_D = 1.9007$ <br> $\nu = 42.5$ | $R_7 = +238.0$ " <br> $R_8 = -84.8$ " | $t_4 = 11.9$ " |

Charles W. Frederick
George H. Aklin
INVENTORS

BY *Newton M. Perrins*
*Lolla A. Carter*
ATTORNEYS

Patented May 16, 1939

2,158,179

UNITED STATES PATENT OFFICE 2,158,179

PHOTOGRAPHIC OBJECTIVE

Charles W. Frederick and George H. Aklin, Rochester, N. Y., assignors to Eastman Kodak Company, Rochester, N. Y., a corporation of New Jersey Application May 22, 1937, Serial No. 144,202

2 Claims. (Cl. 88—57)

This invention relates to photographic objectives and particularly to four component lens systems consisting of two dispersive components between two collective components.

Objectives having this general arrangement are well known in the art and it is common practice to employ such systems for purposes where a relative aperture of f. 4.5 or f. 3.5 is sufficient. Such lenses have also been employed at relative apertures of f. 2.8 or f. 2.0, where relatively restricted covering power may be tolerated.

It is an object of the invention to provide a highly corrected objective of the type described capable of operating satisfactorily at a relative aperture of f. 2.0.

It is a further object of the invention to provide a lens of this type which is highly corrected for spherical aberrations, chromatic aberrations, astigmatism, flatness of field, coma, and distortion.

It is a particular object of the invention to provide a highly corrected objective having these characteristics over a relatively wide field.

Other objects and advantages of the invention will be apparent from the following description when read in connection with the accompanying drawing in which:

Fig. 1 shows in section, an objective comprising one embodiment of the invention.

Fig. 2 shows similarly another embodiment of the invention in a modified form of that shown in Fig. 1.

In designing any lens, there are certain fundamental rules to be observed if the various aberrations are to be maintained within given tolerance limits. By choosing and balancing certain arrangements of the lens components, certain glasses having given indices of refraction and dispersive powers, and certain powers of the various elements, one arrives at a lens system which at this stage is usually poorly corrected. As is well known, when one proceeds from this point to bend the various elements, i. e. to change their curvatures without changing their powers, and make other alterations in the specifications such as in spacings, to give a certain covering power within certain tolerance limits, it is generally necessary to make compromises and to use the resulting objective at less than a certain maximum relative aperture. As is also well known, it is usually necessary to repeat many of the calculations whenever, at some later date, it is found necessary to introduce certain changes not previously contemplated. The designing of any lens depends on the tolerance limits which are acceptable, the covering power required, and the maximum relative aperture desired. For example, a lens of the type under consideration when designed to work at an aperture of f. 3.5 would probably not be useful at f. 2.8 without introducing a disturbing amount of spherical aberration. Prior to the present invention, if such a lens were redesigned to work at f. 2.8 and to reduce this spherical aberration, some of the other aberrations such as distortion would be increased and the covering power would necessarily be reduced.

According to the present invention as illustrated in Figs. 1 and 2, a more or less symmetrical system is employed having two bi-convex outer elements and two dispersive inner elements, at least one of which is preferably bi-concave, although both or either may be meniscus or plano-concave. The curvature of the outer surface of each element is made stronger than the curvature of the inner surface. In fact, the outer surface of each dispersive element is also made stronger than the curvature of the adjacent surface of the convex elements and the powers are such that these adjacent surfaces are in marginal contact (i. e. near their edges) as shown. This particular feature provides ease and accuracy of assembly when the lenses are manufactured in large quantities.

According to the preferred embodiment of the invention, both collective (i. e. bi-convex) elements have the same index of refraction for the D line of the spectrum and this index is greater than 1.70, or in the most preferred case, greater than 1.75. Glasses suitable for use in this invention are described in British Patent 462,304. The objects of the invention are partly accomplished, however, if such a glass were used in only one of the collective elements, particularly in the rear collective element. That is, the use of a high index glass in the rear collective element is found to have more useful effects than when employed in the front collective element, although the maximum advantage is gained when it is used in both elements. In either case, each dispersive element should have a refractive index (D-line) equal to or slightly less than that of the adjacent collective element, preferably between .05 and .15 less. However, this dispersive component index may be slightly greater than that of the adjacent collective component. In any case, the dispersive ratio or nu ($\nu$) value of the dispersive component should be at least 15% and preferably over 20% less than that of the adjacent collective component to permit separate achromatizing of the front and back halves of the system.

The lens shown in Fig. 1 has the following specifications:

| Lens | Glass | Radii | Spacings |
|---|---|---|---|
| | | Mm. | Mm. |
| 1 | $N_D=1.9007$ $\nu=42.5$ | $R_1=+95.7$ $R_2=-177.8$ | $T_1=11.9$ $S_1=1.84$ |
| 2 | $N_D=1.7616$ $\nu=26.5$ | $R_3=-87.2$ $R_4=+3460$ | $T_2=4.15$ $S_2=17.8$ |
| 3 | $N_D=1.7616$ $\nu=26.5$ | $R_5=-1913$ $R_6=+89.0$ | $T_3=4.15$ $S_3=2.66$ |
| 4 | $N_D=1.9007$ $\nu=42.5$ | $R_7=+340.5$ $R_8=-78.5$ | $T_4=7.90$ |

The usual sign convention is followed; namely, a surface which is convex to the incident light has a positive radius of curvature and vice versa.

The arrangement of the invention shown in Fig. 2 has the following specifications for a focal length of 100 mm. and a relative aperture of f. 2.0.

| Lens | Glass | Radii | Spacings |
|---|---|---|---|
| | | Mm. | Mm. |
| 1' | $N_D=1.9007$ $\nu=42.5$ | $R_1=+96.8$ $R_2=-174.5$ | $T_1=11.9$ $S_1=1.55$ |
| 2' | $N_D=1.8049$ $\nu=25.5$ | $R_3=-94.1$ $R_4=+2170$ | $T_2=4.15$ $S_2=21.8$ |
| 3' | $N_D=1.8049$ $\nu=25.5$ | $R_5=+882$ $R_6=+81.5$ | $T_3=4.15$ $S_3+2.45$ |
| 4' | $N_D=1.9007$ $\nu=42.5$ | $R_7=+238.0$ $R_8=-84.8$ | $T_4=11.9$ |

This lens differs from that shown in Fig. 1 by having an increased central air space S—2 and a glass for the dispersive elements whose index of refraction for the D line is only 0.1 less than that used in the collective elements. This embodiment of the invention has a flatter field and greater covering power than that shown in Fig. 1, and by further increasing the central air space and making the accompanying changes in curvatures, this particular aberration, namely, curvature of field, can be further reduced at the expense of increased astigmatism. This latter procedure was employed by one of the present inventors and F. E. Altman in designing the lens disclosed in U. S. 1,620,337, Frederick and Altman, which lens gave satisfactory definition at a relative aperture of f. 2.0 over a limited field.

By combining this procedure with the present invention, a lens having highly corrected aberrations and a much greater covering power is obtained.

The present invention incorporates some of the general features discussed in the copending application Frederick & Schade, Serial No. 144,201, filed concurrently herewith.

Having thus described our invention, the advantages gained therefrom, and the details of lens systems to which it has been applied, we wish to point out that it is not limited to the specific structures shown, but we contemplate such modifications and equivalents as fall within the scope of the appended claims.

What we claim and wish to secure by Letters Patent of the United States is:

1. A corrected photographic objective comprising two spaced portions each consisting of a biconvex element axially spaced outside of a dispersive element, at least one of the portions having its dispersive element made of glass whose index of refraction is greater than 1.65 with surfaces having curvatures whose absolute values times the focal length of the objective add to less than 1.4, the algebraic difference of these curvatures times said focal length being less than 1.2 and having its collective element made of glass whose index of refraction is greater than 1.70 with surfaces having curvatures whose absolute values times said focal length add to less than 2.

2. A corrected photographic objective according to claim 1 in which both portions have elements as described in that claim and in which every refractive surface has a radius of curvature greater than 75% of said focal length.

CHARLES W. FREDERICK.
GEORGE H. AKLIN.